United States Patent Office 3,384,779
Patented May 21, 1968

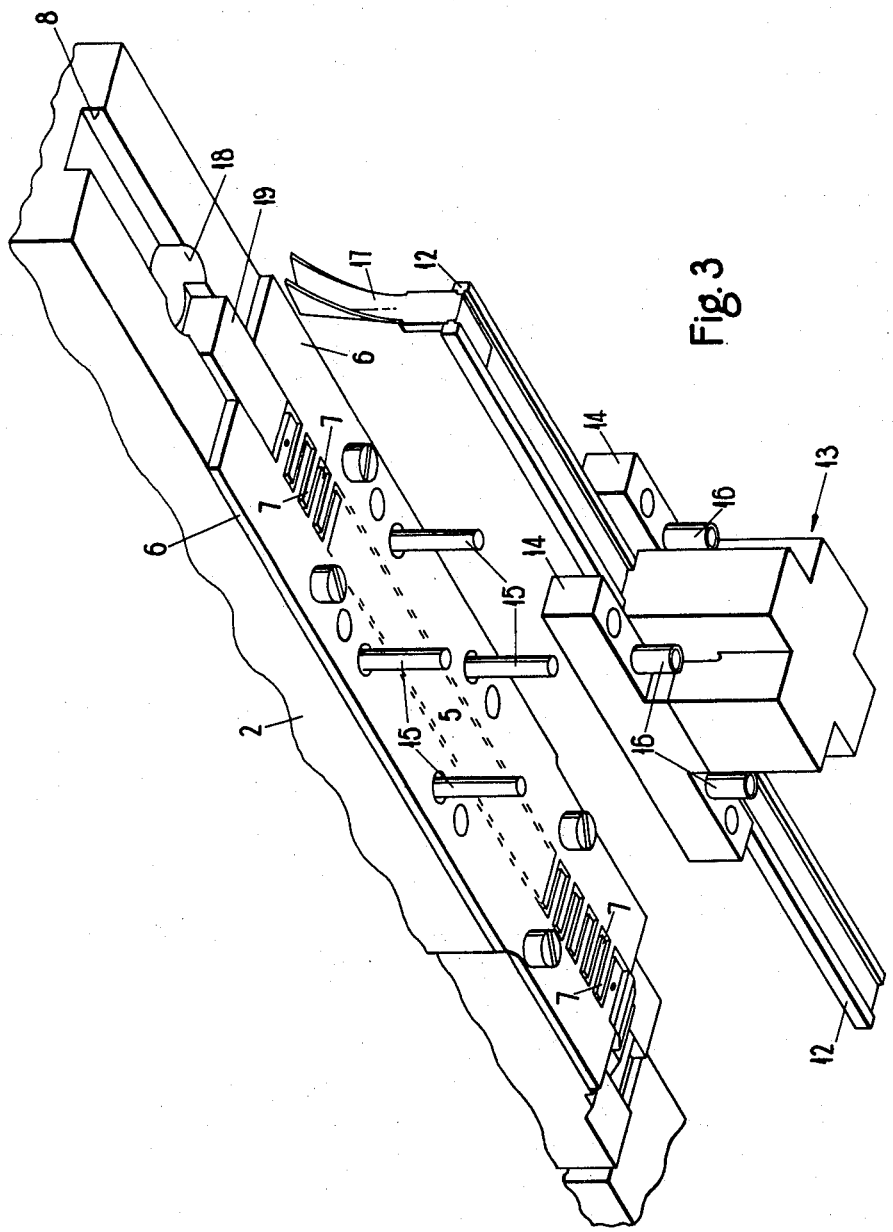

3,384,779
COLLECTOR ELECTRODE SYSTEM FOR M-TYPE TRAVELLING WAVE TUBES
Alan Reddish, Pinner, and Donald William Ward, Watford, England, assignors to The General Electric Company Limited, London, England
Filed July 12, 1965, Ser. No. 471,107
Claims priority, application Great Britain, July 31, 1964, 30,368/64
6 Claims. (Cl. 315—3.5)

ABSTRACT OF THE DISCLOSURE

A collector electrode system for an M-type travelling wave tube in which the collector electrodes define a space in which the electrostatic field has a component parallel to the magnetic field so that electrons entering the space acquire components of velocity parallel to the magnetic field and are thereby caused to impinge on the surface of an electrode of the system.

---

This invention relates to M-type travelling wave tubes.

By an M-type travelling wave tube is meant a travelling wave tube of the kind including: an electrode system defining an elongated interaction space within which there may be established, by applying appropriate potentials to electrodes of the system, an electrostatic field directed perpendicular to the length of the interaction space, the tube being arranged to operate with the interaction space disposed within a magnetic field directed perpendicular to both said electrostatic field and the length of the interaction space; means for projecting an electron beam into the interaction space at one end so as to travel generally along the length of the interaction space under the influence of the crossed electrostatic and magnetic fields; and a transmission line which is capable of propagating an electromagnetic wave in a direction generally parallel to the length of the interaction space so that the electric field of the wave will interact cumulatively with an electron beam travelling along the interaction space. Normally in such a tube at least part of the transmission line is constituted by part or the whole of said electrode system.

One problem which arises in connection with M-type travelling wave tubes is that of collecting the electrons from the beam after they have passed through the interaction space. In such tubes it is conventional to provide a collector electrode (which may be integral with one of the electrodes of the system defining the interaction space) disposed outside the downstream end of the interaction space (that is the end towards which the electron beam flows in operation), the collector electrode being maintained in operation at a positive potential with respect to the source of the electrons. With the conventional arrangement, however, it is possible for an appreciable proportion of the electrons emerging from the interaction space to fail to reach the collector electrode, due to the effect of the magnetic field on the electron trajectories, and in consequence undesirable effects may arise in operation due to electron bombardment of other parts of the tube.

It is therefore an object of the present invention to provide an M-type travelling wave tube which is improved in this respect.

According to the invention, in an M-type travelling wave tube there is provided, beyond the downstream end of the interaction space, a further space into which the electron beam flows after it has traversed the interaction space, the further space being bounded by electrode surfaces which may be maintained at potentials such that there is established in the further space an electrostatic field having a form such that the electrons acquire in the further space appreciable components of velocity parallel to the magnetic field, at least one of said electrode surfaces being disposed so as to intercept electrons moving with such components of velocity.

One arrangement in accordance with the invention will now be described by way of example with reference to the accompanying drawings in which:

FIGURE 3 is an exploded perspective view of part of the tube.

Figure 1:
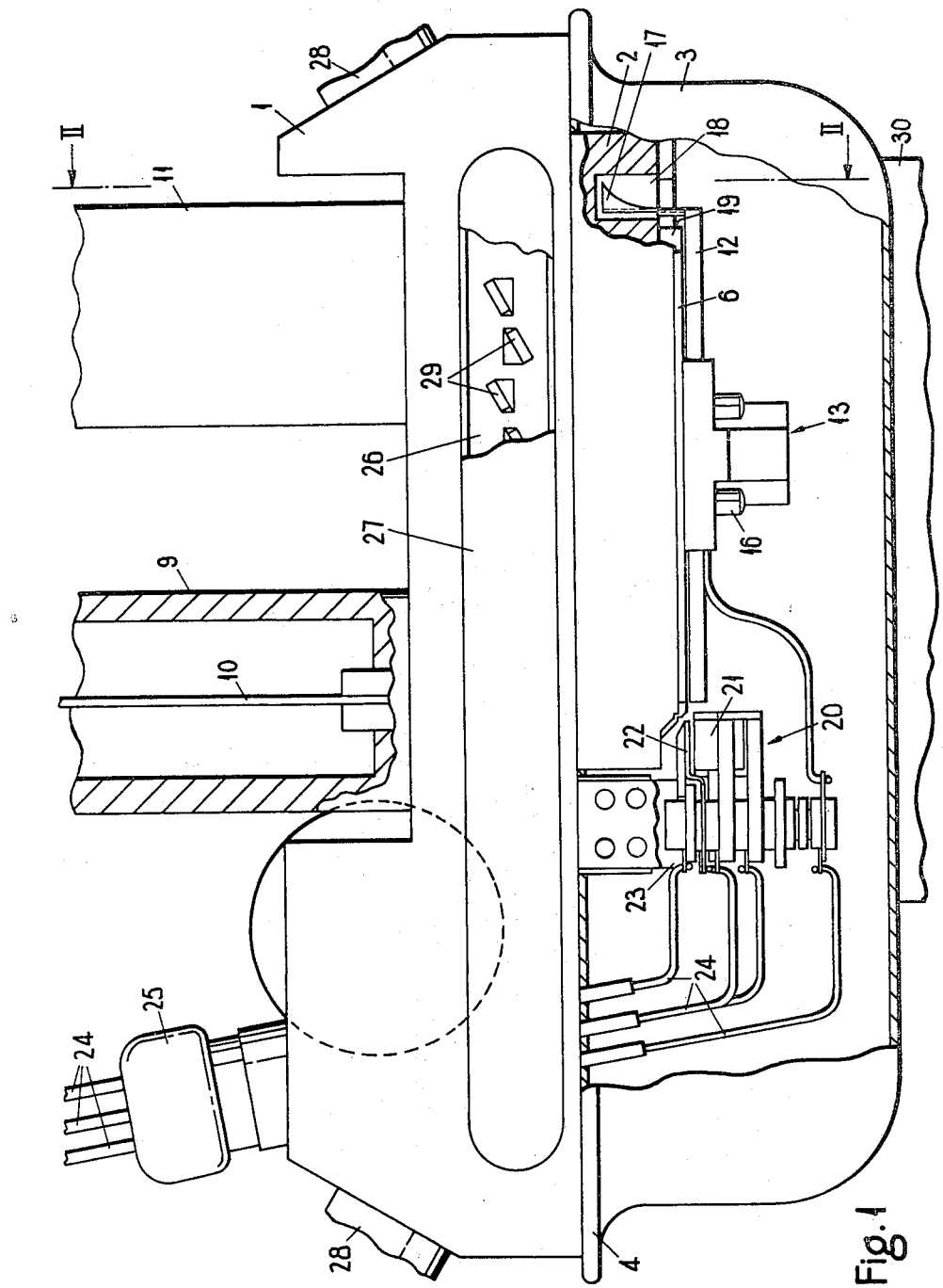
FIGURE 1 is a part-sectional side elevation of an M-type travelling wave tube adapted to operate as a backward wave oscillator.
Figure 2:
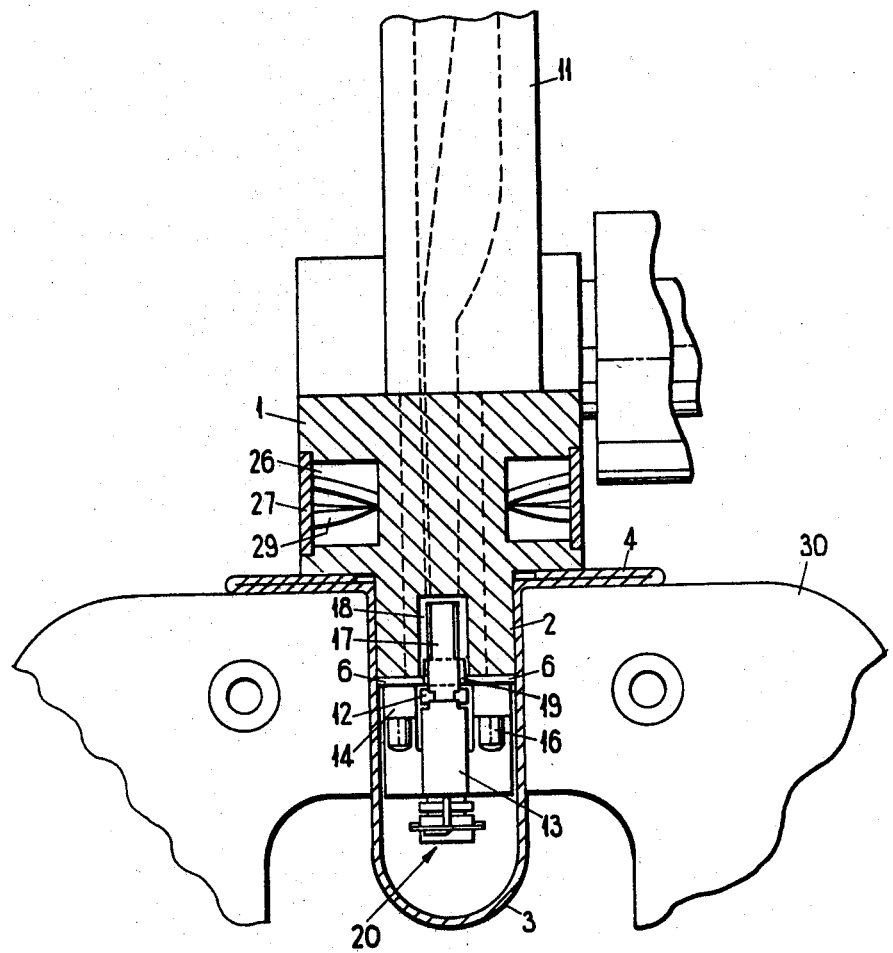
FIGURE 2 is a sectional view along the line II—II in FIGURE 1.

Referring now to FIGURES 1, 2 and 3, the tube has a generally metallic envelope part of which is constituted by a copper member 1 on which is formed a projection 2 which extends into the interior of an elongated metal housing 3 of U-shaped cross-section, the housing 3 forming the remainder of the envelope and being provided around its mouth with an outwardly extending flange 4 which is sealed to the copper member, adjacent the base of the projection 2.

The projection 2 is in the form of an elongated block of rectangular cross-section, one of the long faces of the block constituting the base of the projection 2 and the opposite face having attached to it a delay line 5 of the interdigital type comprising two copper plates 6 of comb-like form, the teeth 7 of which are intercalated and extend transversely across the mouth of a longitudinally extending groove 8 cut into the face of the projection 2 to which the plates 6 are attached. The projection 2 and the plates 6 together constitute the anode of the tube.

At one end the delay line 5 is provided with an output connector in the form of a hollow metal waveguide 9 being disposed within an aperture in the projection 2 so that the interior of the waveguide 9 communicates with the space within the groove 8. The waveguide 9 is provided with a longitudinally extending ridge 10 which projects from one of the broader walls of the waveguide 9, the ridge 10 extending beyond the end of the waveguide 9 to form a stub whose free end is secured to the end tooth 7 of the delay line 5, the two end teeth of the delay line 5 being larger than the other teeth 7.

At its other end the delay line 5 is similarly provided with a further connector in the form of a ridged hollow waveguide 11.

The tube also includes a further electrode 12 (the sole) in the form of a strip of molybdenum of I-shaped cross-section which is disposed with its length parallel to that of the anode 2, 6 so as to extend from a point opposite one end of the delay line 5 to a point somewhat beyond the other end of the delay line 5, the main faces of the sole 12 being disposed parallel to the main faces of the plates 6 with the width of the sole 12 in register with the teeth 7 of the plates 6. The sole 12 is held slightly spaced from the plates 6 by a support 13 made of a high alumina ceramic material which insulates the sole 12 from the anode 2, 6. The support 13 is mounted on two similar molybdenum bars 14 of generally rectangular cross-section which are disposed one on each side of the sole 12 in contact with the plates 6. Each bar 14 is disposed with its longitudinal axis parallel to the longitudinal axis of the sole 12 and is mounted on two pins 15 which extend perpendicularly to the plates 6 through apertures in the relevant plate 6 and bar 14. To secure the bars 14 and the support 13 in position, each pin 15 is brazed adjacent its end to a metal sleeve 16 which is secured to the relevant bar 14 and forms an extension of the associated aperture in that bar 14.

In operation the sole 12 is maintained at a highly negative potential wtih respect to the anode 2, 6 so that there is established in the space between the sole 12 and the delay line 5 (which constitutes the interaction space of the tube) an electrostatic field directed perpendicular to the main faces of the sole 12.

At the end which projects beyond the corresponding end of the delay line 5, the sole 12 has attached to it a further strip 17 of molybdenum which extends generally in a direction perpendicular to the main faces of the sole 12 and towards the member 1, the free end of this further strip being disposed within a cylindrical cavity defined by the internal surface of a blind hole of circular cross-section 18 which extends into the projection 2 from the face to which the plates 6 are attached. The part of the strip 17 lying outside the hole 18 is flat, its main faces being perpendicular to the length of the interaction space and the face nearer the interaction space extending opposite and slightly spaced from one end of a rectangular copper plug 19 which is secured in a part of the groove 8 extending between the delay line 5 and the hole 18, the plug 19 projecting out of the groove 8 so as to have a face flush with the free main faces of the plates 6. The part of the strip 17 lying within the hole 18 is bent so that its cross-section in planes parallel to the main faces of the sole 12 is U-shaped, the limbs of the U extending parallel to the length of the interaction space and increasing in length towards the inner end of the hole 18.

Opposite the end of the interaction space remote from the strip 18 is disposed a conventional electron gun 20 of the crossed field type, the gun comprising a thermionic cathode 21 having an emissive surface disposed parallel to the main faces of the sole 12, and a plate electrode 22 having a surface facing the emissive surface, the gun space between these surfaces being substantially in register with the interaction space with the cathode 21 and sole 12 disposed on corresponding sides of the two spaces. The electrodes of the electron gun 20 are supported from the member 1 by an electrically insulating support 23, and leads 24 for these electrodes and the sole 12 are sealed through a glass dome 25 which is sealed across an aperture in the member 1.

To cool the tube in operation the main body of the member 1 is provided with two longitudinally extending channels 26, closed by cover plates 27, through which water may be passed in operation via inlet and outlet ports 28. To assist cooling a series of twisted metal tags 29 is provided along the length of each channel 26.

In operation the cathode 21 is maintained positive with respect to the sole 12 and the plate electrode 22 is maintained positive with respect to the cathode 21. A portion of the tube is disposed between the poles of a magnet 30 so that there is established in the interaction space, the gun space and the space within the hole 18 a uniform magnetic field directed parallel to the main faces of the sole 12 and perpendicular to the length of the interaction space, the sense of the field being such that electrons emitted from the cathode 21 are caused to travel along the gun space towards the interaction space. The electron beam generated by the electron gun 20 travels generally along the length of the interaction space under the influence of the crossed electrostatic and magnetic fields established in this space. Oscillations are generated in known manner by virtue of a cumulative interaction between the electrons in the interaction space and the electric field of a wave travelling along the delay line 5 generally in a sense opposite to the flow of the electron beam, that is travelling along the line from the connector 11 to the connector 9; an output is derived from the connector 9, the other connector 11 being connected to a reflectionless termination (not shown).

After it has traversed the interaction space the electron beam comes under the influence of the electrostatic field established between the molybdenum strip 17 and the anode 2, 6 these members together constituting a collector electrode system. The beam thus first turns through a right angle so as to flow through the space between the flat part of the strip 17 and the end of the copper plug 19, and then enters the space within the hole 18. Due to the shape of the surfaces of the hole 18 and the bent part of the strip 17, the direction of the electrostatic field changes progressively, in a direction towards the closed end of the hole 18, from being largely perpendicular to the magnetic field to being largely parallel to the magnetic field. In consequence, the electrons acquire appreciable components of velocity parallel to the magnetic field, some in one sense and some in the other but in all cases directed away from the strip 17. Since these components of velocity are unaffected by the presence of the magnetic field, substantially all the electrons reach the surface of the hole 18 and are there collected without giving rise to any undesirable effects.

It will be appreciated that collection of electrons will occur as described above whatever the orientation of the collector electrode system 17, 18 with respect to the interaction space, so long as the magnetic field is directed perpendicular to the axis of the hole 18 and the limbs of the U-shaped part of the strip 17. Thus, in alternative embodiments of the invention, the axis of the hole 18 could, for example, be parallel to the length of the interaction space so that the electron beam passes straight into the collector electrode system from the downstream end of the interaction space, without first turning through a right angle.

It is also pointed out that in alternative embodiments of the invention the electrode of the collector electrode system on whose surface the electrons are collected may be separate from any electrode of the system defining the interaction space.

We claim:

1. A travelling wave tube including: an electrode system defining an elongated interaction space within which there may be established, by application of appropriate potentials to electrodes of the system, an electrostatic field directed perpendicular to the length of the interaction space; means for producing a magnetic field directed perpendicular to both said electrostatic field and the length of the interaction space; means for projecting an electron beam into the interaction space at one end so as to travel generally along the length of the interaction space under the influence of the electrostatic field and the magnetic field; a transmission line which is capable of propagating an electromagnetic wave in a direction generally parallel to the length of the interaction space so that the electric field of the wave will interact cumulatively with an electron beam travelling along the interaction space; a collector electrode system disposed beyond the downstream end of the interaction space which defines a further space within said magnetic field into which the electron beam flows after it has traversed the interaction space; the electrodes of the collector electrode system providing surfaces which are non-parallel to the magnetic field so that on application of appropriate potentials to them there is established in the further space an electrostatic field having a component parallel to the magnetic field such that the electrons in the beam acquire in the further space appreciable components of velocity parallel to the magnetic field, the surface of at least one electrode of the collector electrode system being disposed so as to intercept electrons moving with such components of velocity.

2. A travelling wave tube according to claim 1 wherein the electrodes of the collector electrode system are respectively electrically connected to different ones of the electrodes defining the interaction space.

3. A travelling wave tube according to claim 1 wherein the collector electrode system comprises a first electrode shaped so as to provide an elongated cavity which is open at one end, and a second electrode which extends into the cavity from one end.

4. A travelling wave tube according to claim 3 wherein said cavity is of cylindrical shape with its axis extending perpendicular to the direction of the magnetic field, and said second electrode includes a part within the cavity which is of U-shaped cross-section in planes perpendicular to the axis of the cavity, the limbs of the U extending perpendicular to the direction of the magnetic field and increasing in length towards the inner end of the cavity.

5. A travelling wave tube according to claim 4 wherein said second electrode includes a part outside the cavity which forms part of an electrode system defining a space via which the electron beam flows from the downstream end of the interaction space into said further space.

6. A travelling wave tube according to claim 1 wherein the electrodes of the collector electrode system are respectively electrically connected to different ones of the electrodes defining the interaction space and wherein the collector electrode system comprises a first electrode shaped so as to provide an elongated cavity which is open at one end, and a second electrode which extends into the cavity from one end.

References Cited

UNITED STATES PATENTS

| | | | |
|---|---|---|---|
| 2,745,983 | 5/1956 | Dohler et al. | 315—39.3 X |
| 2,916,657 | 12/1959 | Kompfner et al. | 315—3.6 |
| 3,271,618 | 9/1966 | Kooyers | 315—5.38 X |
| 3,273,006 | 9/1966 | Osepchuk | 315—5.38 X |

HERMAN KARL SAALBACH, *Primary Examiner.*

S. CHATMON, JR., *Assistant Examiner.*